US008997885B2

(12) United States Patent
Krueger

(10) Patent No.: US 8,997,885 B2
(45) Date of Patent: Apr. 7, 2015

(54) CARTRIDGE MONITORING SYSTEM

(76) Inventor: Alfred Krueger, Cibolo, TX (US)

( * ) Notice: Subject to any disclaimer, the term of this patent is extended or adjusted under 35 U.S.C. 154(b) by 512 days.

(21) Appl. No.: 13/422,381

(22) Filed: Mar. 16, 2012

(65) Prior Publication Data

US 2013/0240222 A1 Sep. 19, 2013

(51) Int. Cl.

| | |
|---|---|
| ***A62C 25/00*** | (2006.01) |
| ***A62C 27/00*** | (2006.01) |
| ***A62C 29/00*** | (2006.01) |
| ***A62C 35/60*** | (2006.01) |
| ***G01D 13/00*** | (2006.01) |
| ***A62C 35/02*** | (2006.01) |
| ***A62C 35/13*** | (2006.01) |
| ***A62C 37/50*** | (2006.01) |

(52) U.S. Cl.

CPC ............... *A62C 37/50* (2013.01); *A62C 35/023* (2013.01); *A62C 35/13* (2013.01); *Y10S 169/03* (2013.01)

(58) Field of Classification Search

USPC ................. 169/23, 51, DIG. 3; 220/831, 832; 116/284, 294, 297, 305

See application file for complete search history.

(56) References Cited

U.S. PATENT DOCUMENTS

| | | | | | |
|---|---|---|---|---|---|
| 4,125,084 | A | * | 11/1978 | Salmonsen et al. | 116/99 |
| 4,418,336 | A | * | 11/1983 | Taylor | 340/571 |
| 4,482,123 | A | * | 11/1984 | Corbeil et al. | 248/542 |
| 5,902,028 | A | * | 5/1999 | Hsu et al. | 312/271 |

* cited by examiner

*Primary Examiner* — Ryan Reis

(57) ABSTRACT

A cartridge monitoring system for use in a cartridge-operated fire suppression system having an enclosure with an opening, sidewalls, an interior space, a cover, and a regulator assembly having a cartridge-receiving opening for receiving a cartridge and a regulator mount. The system includes a fixture positioned in the interior space in a fixed position relative to the regulator assembly; an elongate member having a rotation point fixed to a hinge member, a free end, and an arm portion between the free end and the rotation point, with the elongate member being rotatable about the axis of rotation between a first position in which the free end of the elongate member is within the interior space and a second position in which the free end is outside of the interior space.

19 Claims, 7 Drawing Sheets

CARTRIDGE MONITORING SYSTEM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to fire suppression systems. More specifically, the invention is a system that detects removal of a cartridge or canister from a fire suppression system and is operative to prevent the door of an enclosure from closing for so long as the cartridge is removed and the fire suppression system inoperative, and provides a visible, audible or electrical indication of the removal of the cartridge.

2. Description of the Related Art

Fire suppression systems are common in commercial environments. Such systems are typically situated proximal to the most probable ignition sources, such as stoves, friers, grills, and the like, in restaurant environments.

Active fire protection devices typically fall within one of two groups: single vessel stored-pressure systems and cartridge-operated systems. In single vessel stored-pressure systems, an expellant is stored in the same vessel as the firefighting agent itself. For example, the typical wall-mounted fire extinguisher is a single-vessel stored-pressure system that incorporates either pressurized nitrogen or pressurized air in the same vessel as the expellant (e.g., dry chemical, dry powder, water and foam, etc.).

Cartridge operating systems, however, are most likely to be installed in commercial and industrial areas because they are simpler and faster to recharge compared to stored-pressure systems. These types of systems may or may not include a single vessel that includes both the expellant and the firefighting agent. In some systems, opening the cartridge simply actuates the opening of a separate stored-pressure vessel, while in other systems the pressure may be contained within the cartridge itself.

Despite the simplicity and quick recharge of cartridge-operated systems, it can still be expensive to maintain, perhaps costing hundreds of dollars for a certified technician to visit the facility and perform maintenance services, such as recharging the system. As a result, persons who might be working around the fire suppression systems (e.g., cleaning crew) are often tempted to remove, and sometimes do remove, the cartridge from the system to prevent accidental discharge and the subsequent costly recharge service call. In addition, the cartridge typically must be removed during each regular inspection of the system, leaving open the possibility that the inspecting technician may fail to reinstall the cartridge prior to conclusion of the inspection, and thus leave the system inoperative.

In one 2010 restaurant fire, for example, the fire suppression system never activated. After the fire was extinguished, the cartridge was found unconnected to the system and sitting in the bottom of the enclosure housing the suppression system controls. While unconfirmed, those familiar with the situation suspected that someone had removed the cartridge to prevent accidental discharge and then forgot to reconnect the cartridge. The restaurant owners sued everyone, including the fire inspection business that last inspected the system. Unfortunately, there was no independent mechanism in place to confirm that the cartridge was properly installed at the conclusion of the most-recent inspection of the system.

BRIEF SUMMARY OF THE INVENTION

The present invention is a cartridge monitoring system for use with existing fire suppression systems. When the cartridge is removed, the door to the system enclosure is mechanically prevented from closing to provide a visual indicator that a cartridge is not installed in the system and therefore the system is inoperable. In addition, the system provides a visual, audible, or electrical signal to indicate the cartridge is not installed.

The system includes a fixture positioned in the interior space of an enclosure in a fixed position relative to the regulator assembly; a hinge member positioned in the interior space and defining an axis of rotation; an elongate member fixed to the hinge member at a rotation point, a free end, and an arm portion between the free end and the rotation point, with the elongate member being rotatable about the axis of rotation between a first position and a second position to define a partial shell of rotation relative to the hinge member. In the first position, the free end of the elongate member is within the interior space. In the second position, the free end of the elongate member is outside of the interior space.

DETAILED DESCRIPTION OF THE INVENTION

Figure 1:
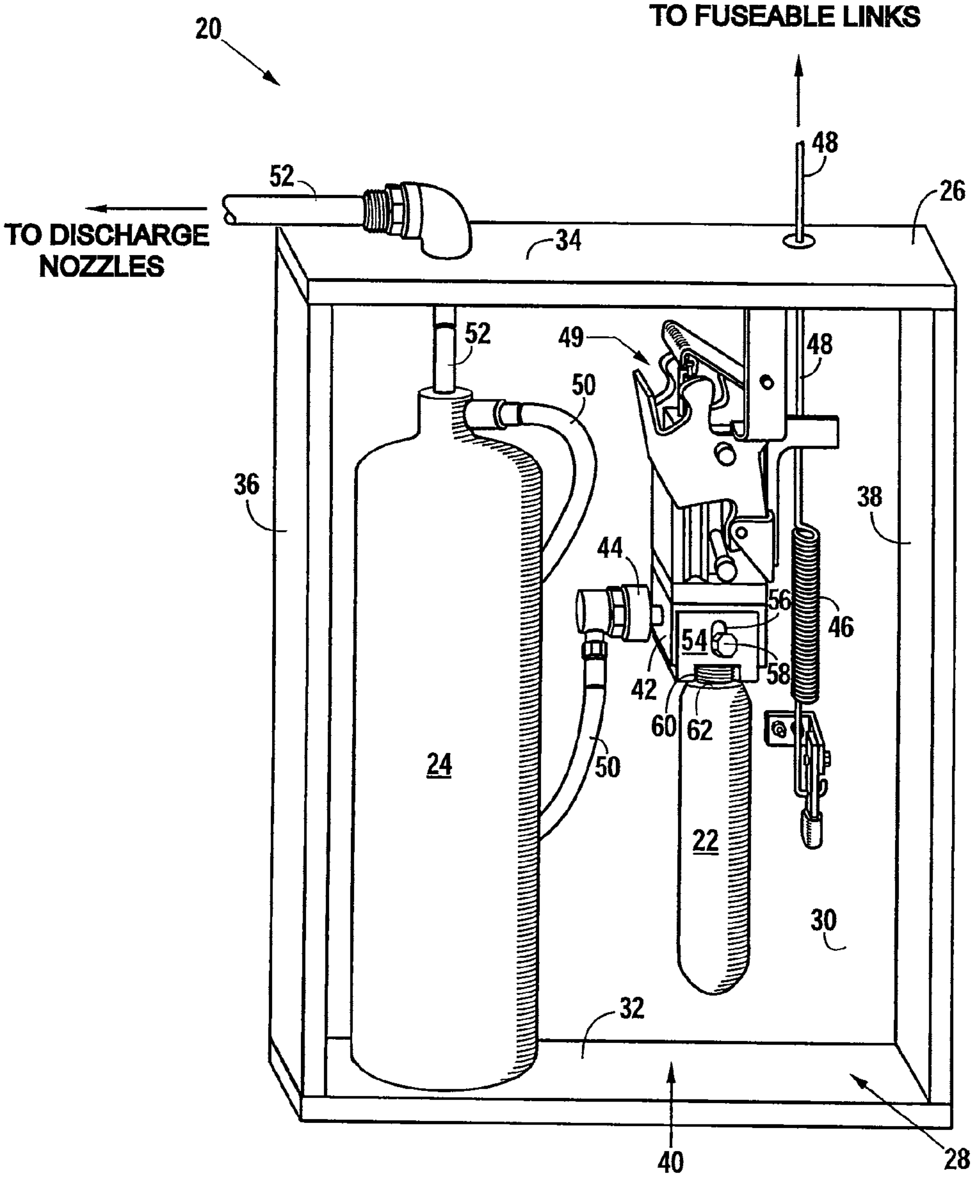
Fig. 1 PRIOR ART
FIG. 1 shows generally a commercial fire suppression system.

FIG. 1 shows components of a typical fire suppression system 20 that might be used in connection with a commercial application, such as a restaurant. An expellant cartridge 22 and extinguishing agent tank 24 are contained within an enclosure 26. The enclosure 26 has a front opening 28 through which a technician or other authorized person may access the various internal components of the system 20. A back panel 30 of the enclosure 26 may be mounted to a wall surface to elevate the contained components to an easily accessible position. The opening 28, bottom wall 32, top wall 34, and opposing sidewalls 36, 38 define the interior volume 40 of the enclosure 26.

The cartridge 22 is threaded to an actuator 42, which is in communication with a regulator 44. A spring 46 is in tension and connected to one end of a break line 48 that runs outside of the enclosure 26 and is attached to one or more remotely-located fusable links (not shown). In the event of a fire, the ambient heat causes one or more fusable links attached to the break line 48 to separate, allowing the spring 46 to trigger a release mechanism 49 that punctures the cartridge 22. Puncturing the cartridge 22 allows the pressure communication from the cartridge 22 through the actuator 42 into the agent tank 24 through a first tubing section 50. The increased pressure within the agent tank 24 forces extinguishing agent into a second tubing section 52 that runs to the exterior of the enclosure 26 and to one or more discharge nozzles (not shown) proximal to targeted areas most likely to be under ignition.

The connection between the cartridge 22 and actuator 42 is facilitated by a square U-shaped suspension bracket 54 having front and back walls extending at the perimeter of a bottom plate at right angles. Front and back walls have aligned front and back guide slots 56 formed therethrough and positioned to engage with mounting bolts 58 fixed to the actuator 42. A slot 60 is formed in the bottom wall of the suspension bracket 54 and has a width smaller than the threads of the cartridge 22 and larger than the neck 62 of the cartridge 22. The bolts 58 are positioned through the front guide slots 56 and engage with aligned bolt holes (not shown) in the actuator 42 to suspend the bracket 54 therefrom. In this cartridge-uninstalled position, the cartridge 22 may be moved horizontally into the slot 60 and supported at the threads by the suspension bracket 54. As the cartridge 22 is threaded into the actuator 42 to a cartridge-installed position shown in FIG. 1, the body of the cartridge 22 contacts the bottom of the bracket 54 and forces the bracket 54 toward the actuator 42. In this cartridge-installed position, the suspension bracket 54 is held fixed between the actuator 42 and the cartridge 22.

Figure 2:
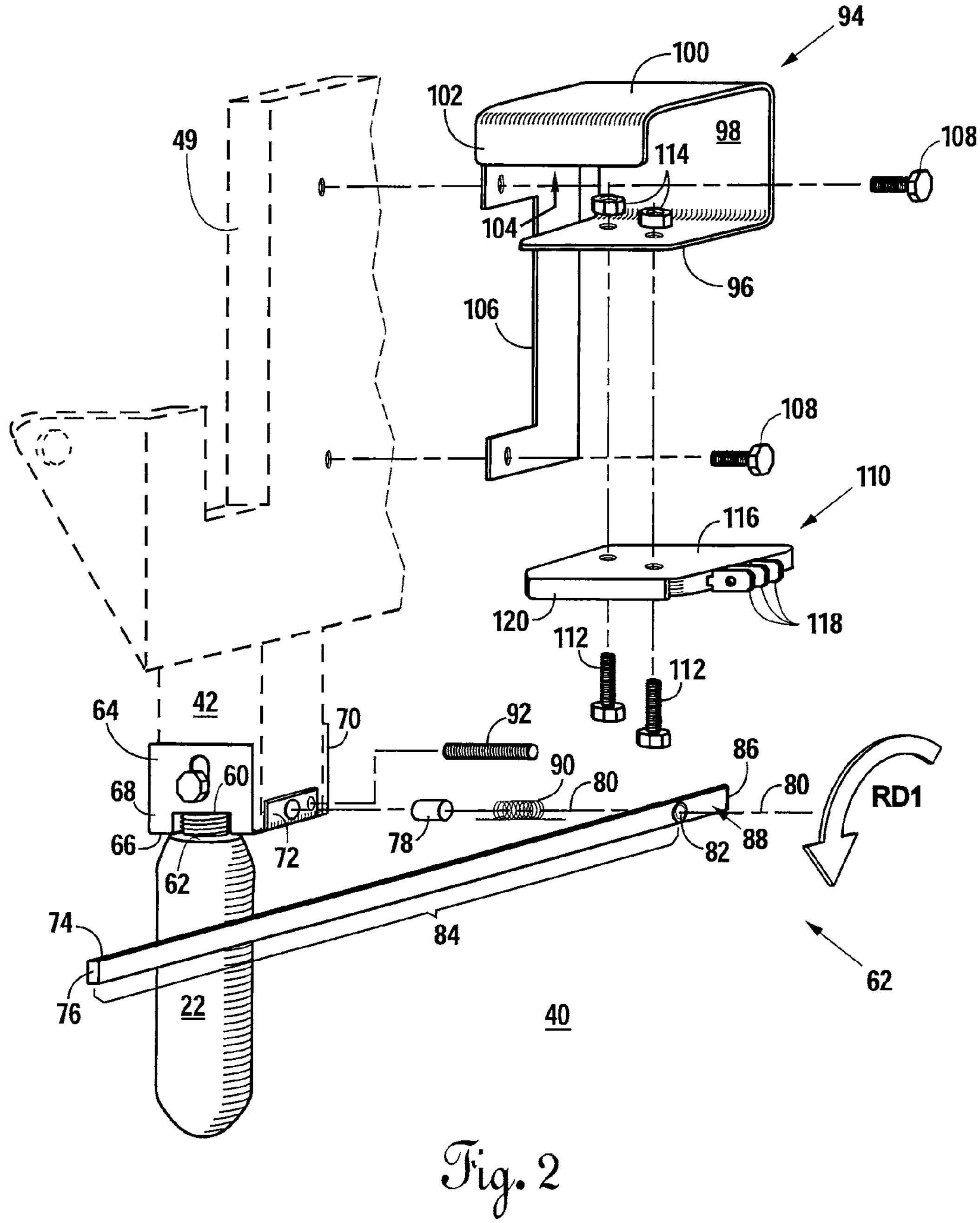
FIG. 2 is an assembly view of a first embodiment of the present invention.

FIG. 2 shows a first embodiment of the cartridge monitoring system 62 of the present invention, which includes a suspension bracket 64 having a bottom plate 66 and first and second opposing side walls 68, 70. The first wall 68 and bottom plate 66 have aligned openings that intersect to form the slot 60 for receiving the threads and neck of a cartridge 22 from a lateral direction. A third sidewall 72 extends away from the perimeter of the base plate 66 and between the first and second side walls 68, 70.

An elongate member 74 having a first free end 76 is rotatably connected to the third sidewall 72 with a hinge member 78 having an axis of rotation 80 that intersects the enclosure sidewalls 36, 38 (see FIG. 1). The hinge member 78 is connected to the elongate member 74 at a rotation point 82, defining an arm portion 84 between the first free end 76 and rotation point 82. Rotation of the arm portion 84 defines a first partial shell of revolution. The elongate member 74 further comprises a second free end 86 that defines a base portion 88 between the second free end 86 and the point of rotation 82. Rotation of the base portion 88 defines a second partial shell of revolution. The base portion 88 is shorter than the arm portion 84.

A torsion spring 90 is connected to the suspension bracket 64 and the elongate member 74 to urge the elongate member 74 in a first rotational direction RD 1 about the axis of rotation 80. Rotation in the first rotational direction RD 1 is limited by a stopping member 92 that is fixed to the third sidewall 72 of the suspension bracket 64. The stopping member 92 extends horizontally away from the third sidewall 72 and intersects the second partial shell of revolution.

Although the preferred embodiment includes a torsion spring 90, other embodiments contemplate relying only on gravitation force by positioning the elongate member 74 in less than a vertical orientation with the center of mass of the elongate member 74 closer to the opening 28 than the axis of rotation of the hinge member 92.

The first and second partial shells of revolution change position relative to the actuator as the suspension bracket 64 is moved to and between the cartridge-uninstalled and cartridge-installed positions. When the suspension bracket 64 is in the cartridge-uninstalled position (shown in FIG. 4), the first and second partials shells of revolution are positioned further from the fixture 94 than when the suspension bracket 64 is in the cartridge-installed position shown in FIG. 3.

Rotation of the elongate member 74 occurs with respect to a first fixture 94 that has a horizontal base plate 96. A back wall 98 extends perpendicularly at one end of the base plate 96. The fixture 94 includes a top plate 100 that is parallel to the base plate 96, and a structural member in the form of a retaining lip 102 that extends from the front of the top plate 100 to define an arm-retaining volume 104. A square U-shaped mounting plate 106 is connected to a side of the base plate 96, back wall 98, and top plate 100. The mounting plate 106 is fixed to the release mechanism with fasteners 108.

A relay 110 is mounted to the base plate 96 with a fasteners 112 and nuts 114 positioned through the relay body 116. The relay 110 includes three contacts 118—common, positive, and negative—and an actuator arm 120 that extends from the relay body 116 and is moveable between actuated and non-actuated positions. The contacts 118 may be wired to indicating circuitry located remotely.

Figure 3:
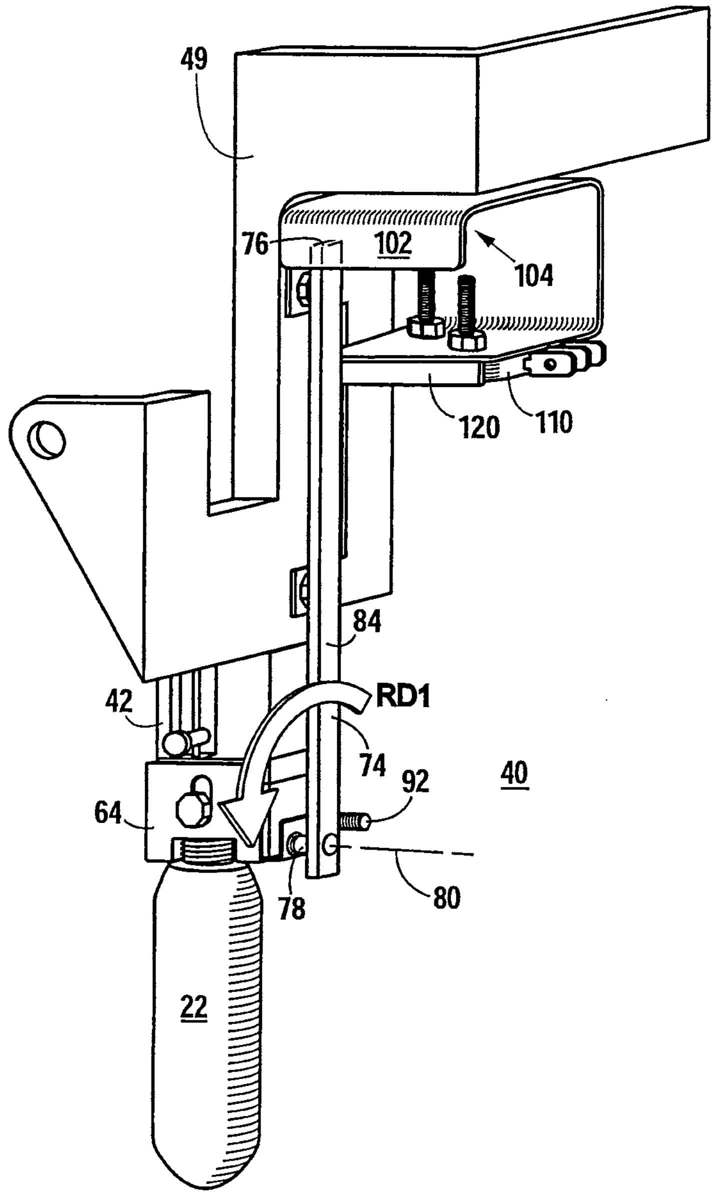
FIG. 3 shows the first embodiment described with reference to FIG. 2 in a cartridge-installed position.

Referring to FIG. 3, when a cartridge 22 is fully installed, the suspension bracket 64 is held fixed against the actuator 42. In this cartridge-installed position, the distance between the axis of rotation 80 and the arm-retaining volume 104 is less than the length of the arm portion 84. Thus, in this position, if the first free end 76 of the elongate arm 74 is positioned within the arm-retaining volume 104, rotational movement of the elongate member 74 is resisted by the retaining lip 102. Also in this position, the arm portion 84 contacts the relay arm 120 to actuate the relay 110.

Figure 4:
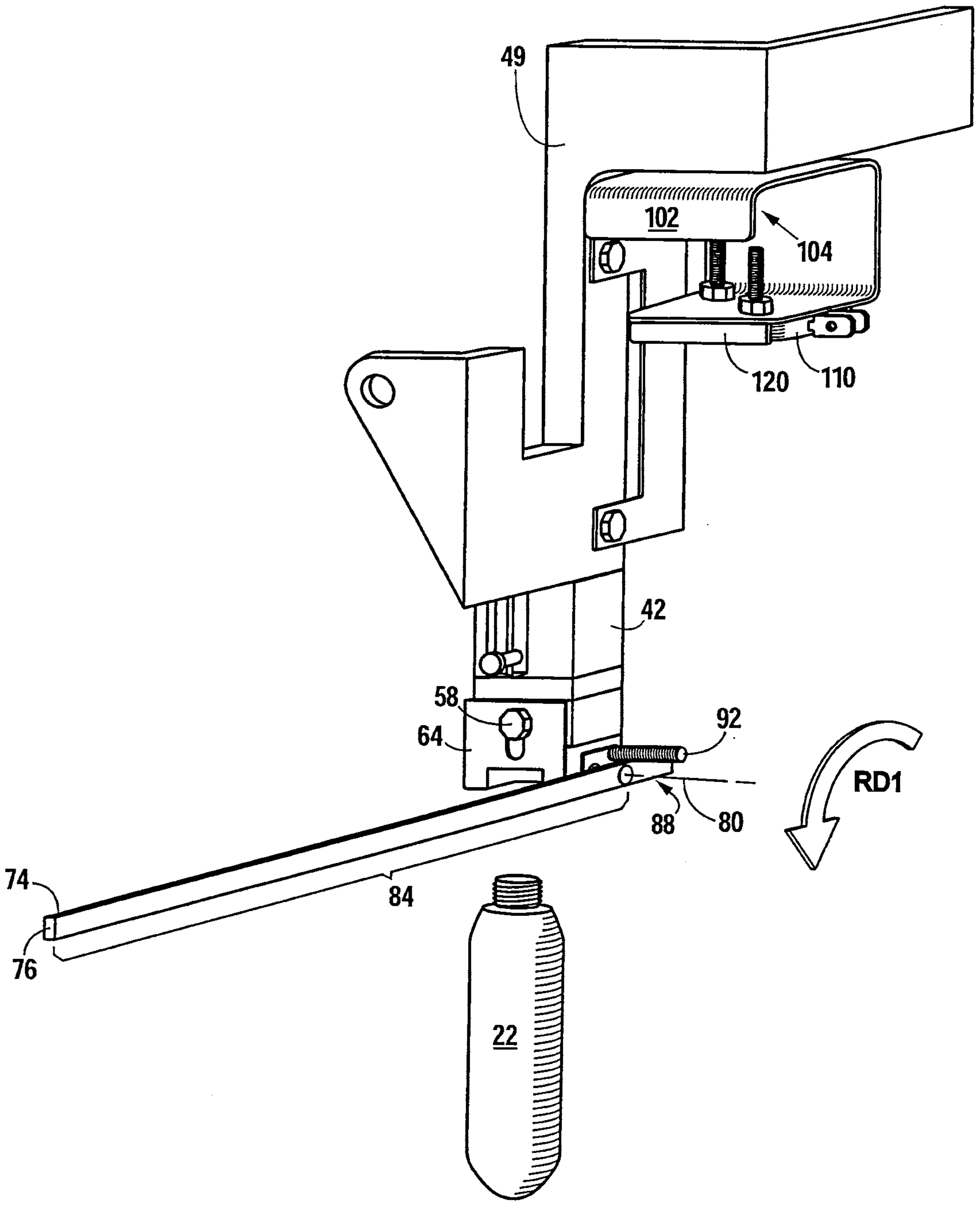
FIG. 4 shows the first embodiment described with reference to FIG. 2 and FIG. 3 in a cartridge-uninstalled position.

Referring to FIG. 4, when a cartridge 22 is not installed, the suspension bracket 64 suspends freely from guide bolts 58. In this cartridge-uninstalled position, the distance between the axis of rotation 80 and the arm retaining volume 104 is greater than the length of the arm portion 84 of the elongate member 74. Thus, in this position, if the elongate member 74 were moved to a vertical orientation and released, the torsion spring 90 (see FIG. 2) urges the elongate member 74 in the first rotational direction RD1 until the base portion 88 is inhibited from further movement by the stopping member 92. In this position, the free end 76 of the elongate member 74 is positioned outside of the interior space 40 of the enclosure 26, and the opening 28 cannot be covered with the elongate member 74 in this position (see FIG. 1).

Figure 5:
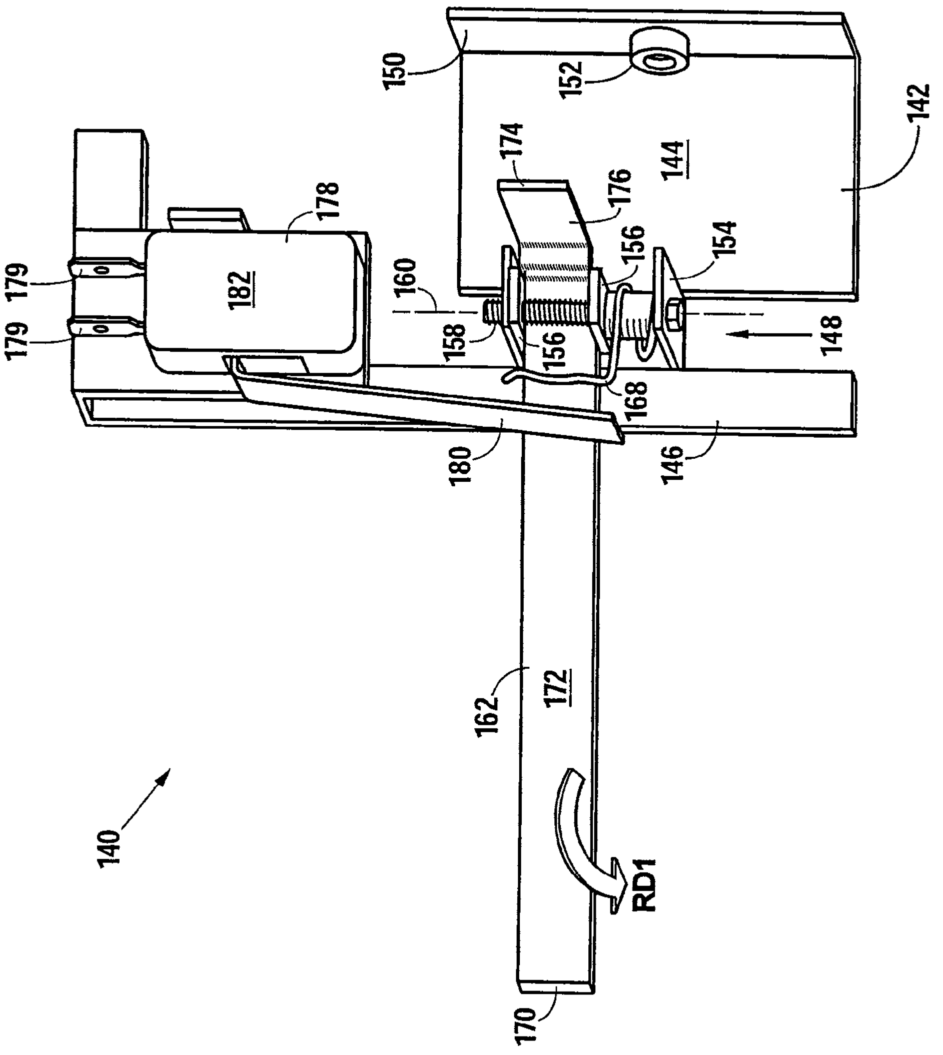
FIG. 5 depicts a second embodiment of the present invention.

FIG. 5 depicts a second embodiment 140 of the present invention, which comprises a plate fixture 142 with a planar first portion 144, a second portion 146, and a planar bridge portion 148 between the first portion 144 and the second portion 146. A mounting wall 150 extends perpendicularly from the first portion 144 with a set screw hole 152 disposed therethrough for receiving a set screw (not shown) for fixing the plate fixture 142 to the enclosure.

A hinge mount 154 extends upward from and is fixed to the bridge portion 148 of the plate fixture 142. A hinge member 158 extending therebetween and having an axis of rotation 160.

An elongate member 162 is fixed to the hinge member 158 at a rotation point and may rotate relative to the plate fixture 142. A torsion spring 168 is fixed to the hinge mount 154 and the elongate member 162 to urge the elongate member 162 in a first rotational direction RD1.

The elongate member 162 comprises a first free end 170 and an arm portion 172 between the first free end 170 and the rotation point. Two hinge walls 156 are attached to the elongate member 162 to receive the hinge member 158. The elongate member 162 also comprises a second free end 174 and a base portion 176 extending between the second free end 174 and the rotation point 166. The arm portion 172 and the base portion 176 are in a perpendicular relationship. The length of the base portion 176 is less than the length of the arm portion 172. Rotation of the elongate member 162 about the axis of rotation 160 in one rotational direction (opposite RD1) is limited by contact of the base portion 176 with the first portion 144 of the plate fixture 142.

A relay 178 with contacts 179 is mounted to the second portion 146 of the plate fixture 142. The relay 178 includes an actuator arm 180 that extends from one side of the relay body 182 toward the member. When the elongate arm 162 is in the first relative position and the base portion 176 is in contact with the plate fixture 142, the actuator arm 180 is in a normal state and the relay 178 is not actuated. When the elongate member 162 is not in contact with the actuator arm 180 (as shown in FIG. 5), the relay 178 is actuated and is not in its normal state.

Figure 6:
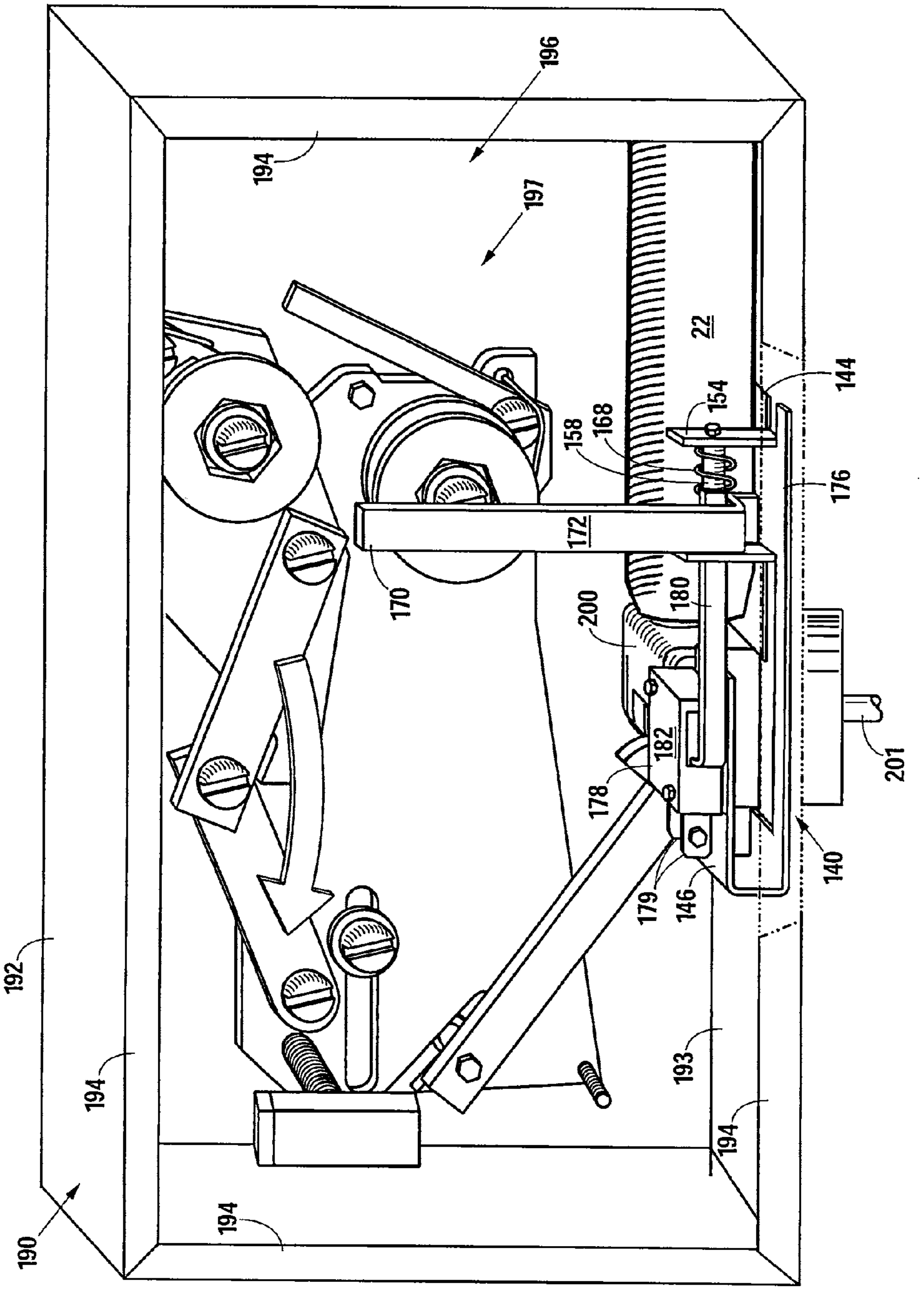
FIG. 6 shows the second embodiment described with reference to FIG. 5 in use with a second fire suppression system in a cartridge-installed position.

FIG. 6 shows the second embodiment 140 described with reference to FIG. 5 installed in a fire suppression system 190 having an enclosure 192 with a bottom wall 193 and a rim 194 defining an enclosure opening 196 and an interior space 197, an actuating mechanism 198, a regulator assembly in the form of a system actuator valve 200, and a cartridge 22 in fluid communication with the system actuating valve 200. When an attached fusable link (not shown) is broken, as described with reference to the first embodiment (see FIGS. 1-4), the actuating mechanism 198 operates to open a communication flow path to the cartridge 22, thereby releasing the pressurized expellant within the cartridge 22 into a tubing section 201 to force the extinguishing agent from an associated extinguishing agent tank (not shown).

The first portion 144 of the plate fixture 146 is positioned between the enclosure bottom wall 193 and the cartridge 22. The base portion 176 of the elongate arm 162 is positioned between the first portion 144 and the cartridge 22. With the cartridge 22 in its normally installed position being threaded into the actuating valve 200 inhibits rotational movement of the elongate member 162. In this position, the arm portion 172 of the elongate member 162 extends away from the rim 194, and is positioned completely within the enclosure interior space 197. In this position, the arm portion 172 of the elongate member 162 contacts the actuator arm 180 to actuate the relay 182 to its normal normally-open state.

Figure 7:
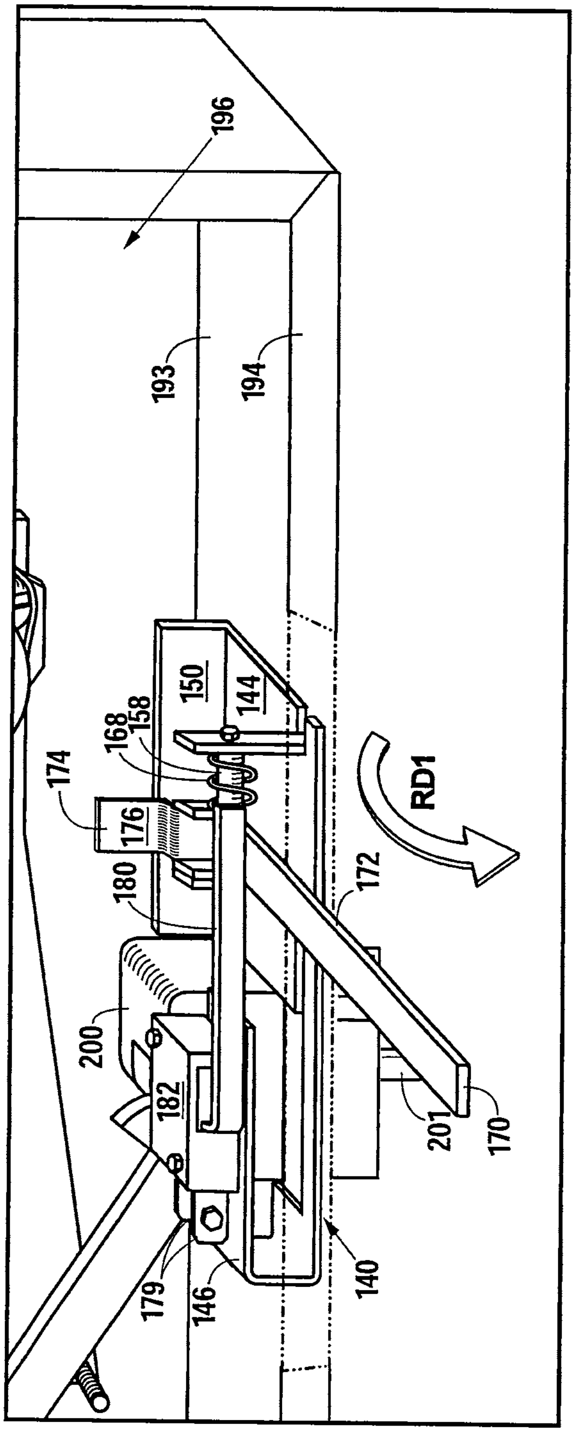
FIG. 7 shows the second embodiment described with reference to FIG. 5 in a cartridge-uninstalled position.

FIG. 7 shows this embodiment 140 with the fire suppression system 190 after the cartridge 22 (see FIG. 6) has been removed. Following removal of the cartridge, because the cartridge no longer rests on the base portion 176 of the elongate member 162, torsion spring 168 urges the elongate member 162 in the first rotational direction. This causes the elongate arm 162 to no longer contact the actuator arm 180 to actuate the relay 178 and to extend through the opening 196 of the enclosure 192. In this position, the relay 178 transitions to a second state that corresponds to a "cartridge not present" signal at the contacts 179. The relay contacts 179 may be in electrical communication with external circuitry to detect the change in relay state or, alternatively, that the relay 178 has attained a state corresponding to no cartridge currently installed. Also in this position, the enclosure 192 cannot be closed with a cover.

The present invention is described in terms of a preferred embodiment in which specific embodiments of the system are described. Those skilled in the art will recognize that alternative embodiments of such embodiments can be used in carrying out the present invention. Other aspects and advantages of the present invention may be obtained from a study of this disclosure and the drawings, along with the appended claims.

I claim:

1. A cartridge monitoring system for use in a cartridge-operated fire suppression system having an enclosure with an opening, sidewalls, a bottom wall, a cartridge volume, an interior space, a cover, and an actuator, the cartridge monitoring system comprising:

a fixture positioned in the interior space in a fixed position relative to the actuator;

a hinge member positioned in the interior space and defining an axis of rotation;

an elongate member having a rotation point fixed to said hinge member, a center of mass, a free end, and an arm portion between the free end and the rotation point, said elongate member being rotatable about the axis of rotation between a first position and a second position to define a first partial shell of rotation relative to the hinge member;

a torsion spring fixed to the elongate member to urge the elongate member in a first rotational direction around the hinge member;

wherein in the first position the free end of the elongate member is within the interior space; and wherein in the second position the free end of the elongate member is outside of the interior space.

2. The cartridge monitoring system of claim 1 further comprising a relay having at least one output and a relay actuator, wherein the relay actuator intersects the partial shell of rotation.

3. The cartridge monitoring system of claim 1 wherein the axis of rotation intersects the sidewalls of the enclosure.

4. The cartridge monitoring system of claim 1 wherein in the first position the arm portion of the elongate member does not intersect the opening of the enclosure.

5. The cartridge monitoring system of claim 1 wherein in the second position the arm portion of the elongate member intersects the opening of the enclosure.

6. The cartridge monitoring system of claim 1, said elongate member further comprising a second free end and a base portion extending between the rotation point and the second free end, and wherein rotation of the base portion about the axis of rotation defines a second partial shell of rotation.

7. The cartridge monitoring system of claim 6 further comprising:

a regulator assembly having a cartridge receiving opening;

a suspension bracket attached to the regulator assembly and movable relative to the cartridge receiving opening between a cartridge-installed position and a cartridge-uninstalled position, the suspension bracket having a base plate with a perimeter, a first sidewall extending from a first side of the base plate, a second sidewall extending from an opposing side of the base plate, and a third sidewall extending from the base plate between said first sidewall and said second sidewall, wherein the base plate defines a slot for receiving a cartridge; and a fixed member extending from the suspension bracket and intersecting the second partial shell of rotation.

8. The cartridge monitoring system of claim 7 wherein in the first position the center of mass of the elongate member is positioned between a first vertical plane intersecting the axis of rotation and the opening of the enclosure.

9. The cartridge monitoring system of claim 7 wherein the fixture comprises a structural member intersecting the first partial shell of rotation when the suspension bracket is in the cartridge-installed position and not intersecting the shell of rotation when the suspension bracket is not in a cartridge-uninstalled position.

10. The cartridge monitoring system of claim 1 further comprising a planar first portion in contact with the bottom wall of the enclosure and located proximal to the actuator.

11. The cartridge monitoring system of claim 2 wherein the fixture further comprises an elevated portion fixed to said relay.

12. The cartridge monitoring system of claim 6 wherein the fixture further comprises:

a regulator assembly having a cartridge receiving opening; and a planar first portion, a second portion, and a bridge portion connecting said planar first portion and said second portion, wherein the bridge portion, the planar first portion, and the second portion defines a volume partially surrounding the regulator assembly.

13. The system of claim 12 wherein the planar first portion is positioned between the cartridge volume and the bottom wall of the enclosure.

14. The system of claim 6 wherein the arm portion is angled with respect to the base portion.

15. The system of claim 13 wherein in the first position the base portion of the elongate member is in contact with the planar first portion of the fixture.

16. The system of claim 15 wherein the base portion of the elongate member is in perpendicular relationship with the arm portion of the elongate member.

17. A cartridge monitoring system for use in a cartridge-operated fire suppression system having an enclosure with an opening, sidewalls, a bottom wall, a cartridge volume, an interior space, a cover, and an actuator, the cartridge monitoring system comprising:

a fixture positioned in the interior space in a fixed position relative to the actuator;

a hinge member positioned in the interior space and defining an axis of rotation;

an elongate member having a rotation point fixed to said hinge member, a center of mass, a free end, and an arm portion between the free end and the rotation point, a second free end, and a base portion the elongate member having a base portion extending between the rotation point and the second free end, said elongate member being rotatable about the axis of rotation between a first position and a second position to define a first partial shell of rotation relative to the hinge member;

wherein in the first position the free end of the elongate member is within the interior space; and wherein in the second position the free end of the elongate member is outside of the interior space.

18. A cartridge monitoring system for use in a cartridge-operated fire suppression system having an enclosure with an opening, sidewalls, a bottom wall, a cartridge volume, an interior space, a cover, and an actuator, the cartridge monitoring system comprising:

a fixture positioned in the interior space in a fixed position relative to the actuator;

a hinge member positioned in the interior space and defining an axis of rotation;

an elongate member having a rotation point fixed to said hinge member, a center of mass, a free end, and an arm portion between the free end and the rotation point, a second free end, and a base portion extending between the rotation point and the second free end, said elongate member being rotatable about the axis of rotation between a first position and a second position to define a first partial shell of rotation and a second partial shell of rotation relative to the hinge member;

a regulator assembly having a cartridge receiving opening;

a suspension bracket attached to the regulator assembly and movable relative to the cartridge receiving opening between a cartridge-installed position and a cartridge-uninstalled position, the suspension bracket having a base plate with a perimeter, a first sidewall extending from a first side of the base plate, a second sidewall extending from an opposing side of the base plate, and a third sidewall extending from the base plate between said first sidewall and said second sidewall, wherein the base plate defines a slot for receiving a cartridge;

a fixed member extending from the suspension bracket and intersecting the second partial shell of rotation;

wherein in the first position the free end of the elongate member is within the interior space; and wherein in the second position the free end of the elongate member is outside of the interior space.

19. A cartridge monitoring system for use in a cartridge-operated fire suppression system having an enclosure with an opening, sidewalls, a bottom wall, a cartridge volume, an interior space, a cover, and an actuator, the cartridge monitoring system comprising:

a fixture positioned in the interior space in a fixed position relative to the actuator, said fixture having an elevated portion;

a hinge member positioned in the interior space and defining an axis of rotation;

an elongate member having a rotation point fixed to said hinge member, a center of mass, a free end, and an arm portion between the free end and the rotation point, said elongate member being rotatable about the axis of rotation between a first position and a second position to define a first partial shell of rotation relative to the hinge member;

a relay having at least one output and a relay actuator, wherein the relay actuator intersects the partial shell of rotation, said relay fixed to said elevated portion of said fixture;

a regulator assembly having a cartridge receiving opening;

a planar first portion, a second portion, and a bridge portion connecting said planar first portion and said second portion, wherein the bridge portion, the planar first portion, and the second portion define a volume partially surrounding the regulator assembly;

wherein in the first position the free end of the elongate member is within the interior space; and wherein in the second position the free end of the elongate member is outside of the interior space.

* * * * *